United States Patent [19]

Doty

[11] 4,346,259

[45] Aug. 24, 1982

[54] LOW SPEED TERMINAL INTERFACE FOR ALL-DIGITAL PABX

[75] Inventor: Jay Doty, Santa Ana, Calif.
[73] Assignee: Anderson Jacobsen, Inc., San Jose, Calif.
[21] Appl. No.: 162,115
[22] Filed: Jun. 23, 1980
[51] Int. Cl.³ .......................... H04J 3/02; H04B 1/16; H04L 5/22
[52] U.S. Cl. .................................. 178/3; 179/2 DP; 370/42
[58] Field of Search ...................... 179/18 AD, 2 DP; 370/41, 42, 47, 48; 375/106, 107; 178/2 R, 2 C, 2 D, 3

[56] References Cited

U.S. PATENT DOCUMENTS

| | | | |
|---|---|---|---|
| 3,366,737 | 1/1968 | Brown, Jr. ............................ | 370/42 |
| 3,476,878 | 11/1969 | Oshima et al. ........................ | 370/42 |
| 3,963,871 | 6/1976 | Thyselius et al. ..................... | 370/42 |

*Primary Examiner*—Thomas A. Robinson

*Attorney, Agent, or Firm*—Lowhurst & Aine

[57] ABSTRACT

An interface for synchronizing the output of standard asynchronous terminals with a PABX allows all terminals to operate asynchronously with respect to each other. The output from the I/O terminal, which comprises a binary data stream in an asynchronous code, is sampled at a rate of at least three times greater than the output bit rate of the terminal. A clock signal to effect the sampling is generated within the PABX. The sampled data appears to the PABX as a bit stream synchronized with the PABX clock, allowing direct application of the sampled data to the PABX. The receiving terminal, upon reception of a start bit, waits one-half time (of its own clock) and samples the received data to reconstruct the received bits into corresponding alphanumeric characters. The frequency of the clocks internal to each terminal may vary within one percent of each other before requiring each terminal to be synchronized with each other.

2 Claims, 3 Drawing Figures

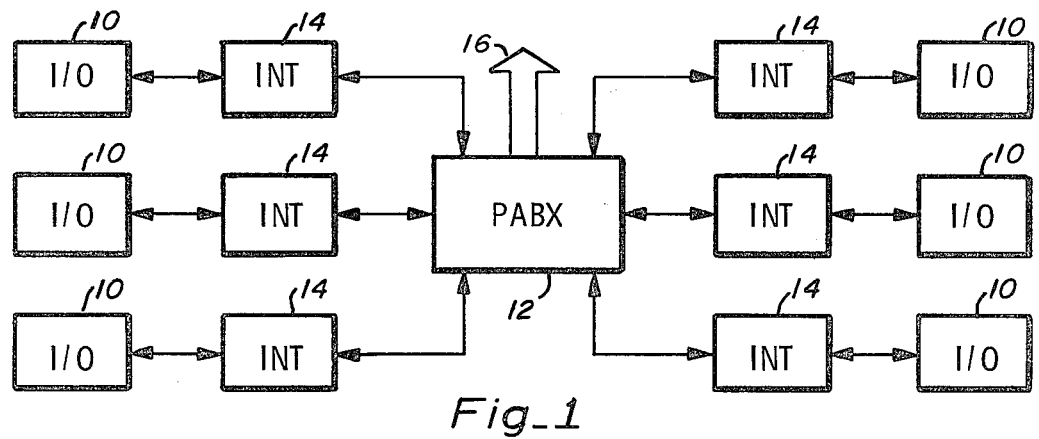
Fig_1
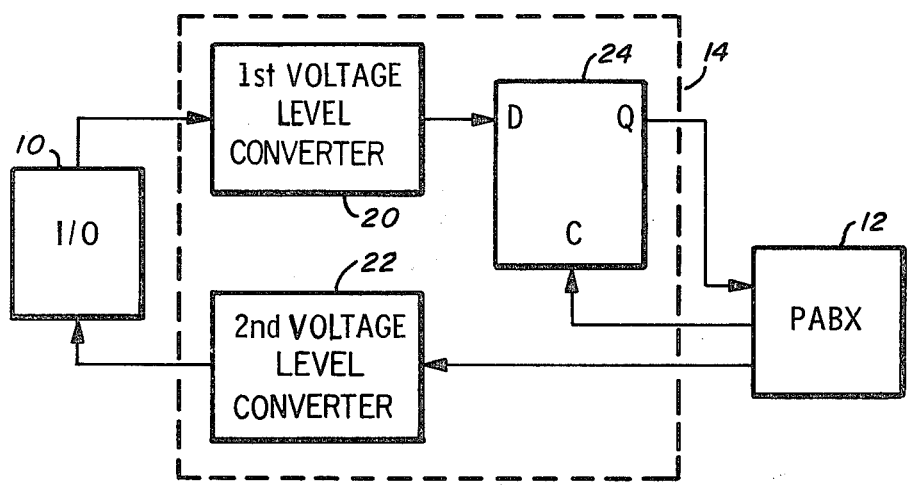
Fig_2
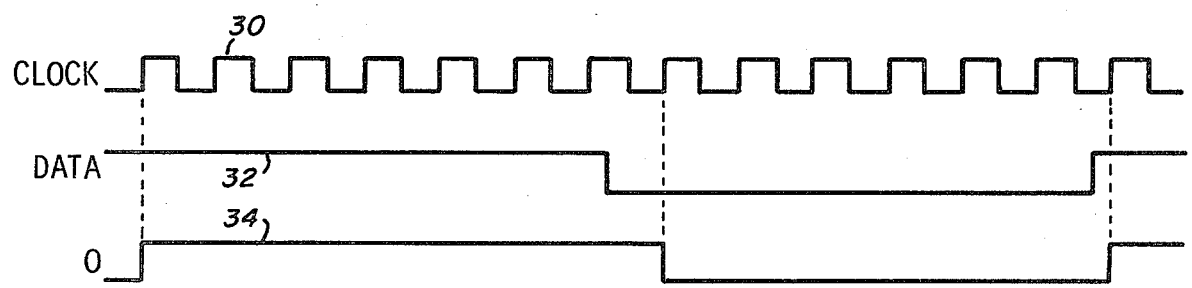
Fig_3

LOW SPEED TERMINAL INTERFACE FOR ALL-DIGITAL PABX

BACKGROUND OF THE INVENTION

The present invention relates generally to the interfacing of I/O terminals with a switching network and, more particularly, describes a data interface for synchronizing standard dumb I/O terminals with a digital PABX.

An analog PABX switches I/O terminals, which may be either digital data or analog voice between each other for the communication of information. Also, trunk lines are provided for the interconnection of one PABX to another. In order that a terminal may be incorporated into the PABX system, an interface is usually required. As an example, binary encoded data generated by a terminal may be transmitted over standard telephone lines by interfacing the terminal into a telephone by use of a modem. However, modems are usually relatively expensive or electronically complex.

Digital PABX (with digital transmission to telsets) usually have high speed, say 64,000 bits per second or higher, synchronous transmission to and from the telset. I/O terminals for the conversion of alphanumeric characters into a data stream of a standard asynchronous code (such as the ASCII code with RS 232C protocol) usually require the interface first to buffer the data and then synchronize the data stream to the internal clock of the PABX. Such an interface requires complex logic and individual adjustment or baud rate settings in the field.

SUMMARY OF THE INVENTION

Accordingly, it is an important object of the present invention to provide a data interface for connection of asynchronous terminals to an all-digital PABX which is of simpler construction than known interfaces for providing greater reliability and convenience at lesser expense.

Accordingly, this and other objects are achieved by providing an interface which receives binary encoded data from a standard dumb I/O terminal. The output of the I/O terminal is applied to a first voltage level converter for referencing to the voltage levels used within the PABX. The data is then applied to a common flip-flop which is clocked at a rate at least three times greater than the output bit rate from the I/O terminal. The clock signal for sampling is generated by the PABX. The output from the flip-flop, which comprises sampled binary encoded data, may then be directly applied to the PABX. This method of sampling effects synchronization of the I/O terminal with the PABX. A receiving interface need only change the reference voltage level of the received data to be consistent with the voltage reference within the receiving I/O terminal.

BRIEF DESCRIPTION OF THE DRAWINGS

FIG. 1 is a block diagram illustrating the general arrangement of a simple PABX system and the position of the interfaces for the I/O terminals;

FIG. 2 is a schematic block diagram of a preferred embodiment of the data interface of the present invention;

FIG. 3 is a timing diagram illustrating the data sampling by the data interface of FIG. 2.

DETAILED DESCRIPTION OF THE DRAWINGS

FIG. 1 shows the layout of a typical digital PABX system. Data is put into this system at one of a plurality of I/O terminals 10 and interfaced into the PABX network 12 through a data interface 14. Trunk line 16 enables the interconnection of a plurality of PABX systems. The I/O terminal 10 is typically a standard dumb terminal for the conversion of alphanumeric characters into binary encoded data, and operates at any of the standard output bit rates. As an example, the I/O terminal 10 may be a standard RS 232C dumb terminal and the PABX 12 may be any all digital commercially operated public automatic branch exchange.

FIG. 2 shows one of the I/O terminals 10 interfaced with the PABX 12 through a preferred interface 14 of the present invention. To compensate for the difference of voltage reference levels between the individual I/O terminal 10 and the PABX 12, the preferred interface 14 of the present invention includes a first voltage level converter 20 for receiving data from the I/O terminal 10. Similarly, a second voltage level converter 22 is provided to change the voltage reference level for received data before application to the I/O terminal 10. The binary encoded data received from the terminal 10, after the voltage levels have been properly referenced, is applied to the sampling means being the flip-flop 24. Upon the occurrence of the reference edge of a clock signal generated by PABX 12 and applied to the C input of flip-flop 24, the data at the D input is enabled to the Q output to effect the sampling. The Q output of flip-flop 24 may then be directly applied to the PABX 12. The method described for sampling the data synchronizes the I/O terminal 10 to the PABX 12. The Q output generates a string of data bits synchronized with the clock signal. Level converter 20 and flip-flop 24 comprise a transmission channel, and level converter 22 comprises a reception channel.

FIG. 3 shows possible representations of a clock signal 30, a data signal 32 and a sampled data signal 34, as generated by the Q output of flip-flop 24 of FIG. 2. As shown, the clock signal 30 has a frequency 6⅔ times the bit rate of the data signal 32. As can be seen, the sampling creates a slight change in the width of each pulse of the sampled data signal 34. However, this error is inconsequential, as hereinafter explained.

The I/O terminal 10, when operating in the asynchronous mode, will convert each alphanumeric into a standard asynchronous code, such as the ASCII code, a feature of which is the inclusion of a start bit and two stop bits enveloping the message bits encoding each alphanumeric character. The PABX 12 continuously applies a constant binary logic level to each of the I/O terminals 10 through the interface 14, so that each I/O terminal 10 is kept in a marking state of a constant binary logic level. The start bit is typically a binary data bit of the opposing logic level. The internal clock of the receiving I/O terminal 10, upon reception of the start bit, waits one-half bit time to effect sampling of received data bits from the PABX 12. As long as the frequency of the internal clocks within each I/O terminal 10 are within one percent of each other, then the sampling of the received data within the I/O terminal 10 nullifies the effects of the pulse width error of the sampled signal 34 of FIG. 3. Normally, the frequency of the clocks of each of the I/O terminals 10 will be within 0.01 percent of each other and need not be synchronized. The binary encoded data as applied to a receiving I/O terminal 10 is identical to the same data as sampled within the same I/O terminal 10 with only an additional error occuring at the edge of the data pulse because of the asynchronous operation of each I/O terminal. This slight error is acceptable because each I/O terminal 10 will sample the received data pulse as close to the center of the pulse as possible.

There has been described novel apparatus and techniques for interfacing standard dumb terminals into a common PABX system. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus or techniques herein disclosed and limited solely to the spirit and scope of the appended claims.

What is claimed is:

1. A data interface for the interfacing of a first I/O terminal for the conversion of alphanumeric characters to binary encoded signals with a PABX for switching and multiplexing the signals for the subsequent application to a second I/O terminal interfaced with the PABX for the conversion of the signals to alphanumeric characters, said data interface comprising:

a transmission channel including, a first voltage level converter for application of binary encoded signals from said first I/O terminal, means for sampling the applied signals having a first input responsive to said first voltage converter, a second input responsive to a clock signal developed by said PABX, and an output for applying the sampled signals to said PABX; and a reception channel including a second voltage level converter for application of received binary encoded signals from said PABX to said second I/O terminal.

2. The method for the interfacing of a first I/O terminal for the conversion of alphanumeric characters to binary encoded signals through a data interface with a PABX for switching and multiplexing the signals for the subsequent application to a second I/O terminal interfaced with the PABX for the conversion of signals to alphanumeric characters, said method comprising the steps of:

applying binary encoded signals from said first I/O terminal to said data interface;

shifting the voltage reference levels of said signals to the reference level of said PABX;

sampling said signals at a rate at least three times greater than the output bit rate from said first I/O terminal;

applying said sampled signals to said PABX for subsequent application to said second I/O terminal; and shifting the voltage reference level of said signals to the reference level of said second I/O terminal.

* * * * *